(12) United States Patent
Kawano

(10) Patent No.: US 6,270,261 B1
(45) Date of Patent: Aug. 7, 2001

(54) SEMICONDUCTOR LASER MODULE

(75) Inventor: Minoru Kawano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/227,083

(22) Filed: Jan. 5, 1999

(30) Foreign Application Priority Data

Jul. 9, 1998 (JP) ................................................ 10-194170

(51) Int. Cl.[7] ..................................................... G02B 6/36
(52) U.S. Cl. ................................ 385/88; 385/92; 385/11; 385/14; 385/93; 372/703
(58) Field of Search ................................. 385/88, 89, 92, 385/93, 49, 11, 14; 372/703

(56) References Cited

U.S. PATENT DOCUMENTS

| 4,375,910 | * | 3/1983 | Seki | 385/88 |
|---|---|---|---|---|
| 4,904,036 | * | 2/1990 | Blonder | 385/88 |
| 4,978,189 | * | 12/1990 | Blonder et al. | 385/88 |
| 5,082,376 | * | 1/1992 | Beylat et al. | 385/88 |
| 5,566,264 | * | 10/1996 | Kuke et al. | 385/49 |
| 6,055,102 | * | 4/2000 | Park | 359/484 |

OTHER PUBLICATIONS

Yamauchi et al., "A Surface Mount Type Optical Module for Automatic Assembly", Proceeding of the 1995 Synthesis Conference, C–184, p. 184.

* cited by examiner

Primary Examiner—Hemang Sanghavi
(74) Attorney, Agent, or Firm—Leydig, Voit & Mayer, Ltd.

(57) ABSTRACT

A semiconductor laser module with an optical isolator. A semiconductor laser module includes a substrate provided with a first optical waveguide and a second optical waveguide, a semiconductor laser diode mounted in front of the first optical waveguide on the substrate, and an optical isolator between the first optical waveguide and the second optical waveguide.

7 Claims, 6 Drawing Sheets

SEMICONDUCTOR LASER MODULE

BACKGROUND OF THE INVENTION

1. Field of the Invention

The present invention relates to a semiconductor laser module provided with an optical isolator used in optical communications systems.

2. Description of the Prior Art

As optical communication is coming into wider use recently, semiconductor laser modules are required to be lower in price and smaller in size. In an attempt to meet these requirements, for example, Yamauchi et al. described a semiconductor laser module which can be made smaller in size in a presentation titled "Surface-Mounted Optical Circuit Module Suited For Automatic Assembly" in 1995 general conference of The Institute of Electronics, Information and Communication Engineers. The semiconductor laser module described in this presentation does not require the adjustment of optical axis, and therefore allows for cost reduction and mass production.

In an optical communications system, there occurs such a problem that light emitted by a semiconductor laser diode chip is reflected from an input end or an output end face of an optical fiber, which transmits the light, and returns to the semiconductor laser diode chip, thus spreading the spectrum of the laser light and/or increasing noise. In order to reduce the reflected light in the prior art systems, simple measures have been taken such as AR coating and oblique cutting of the optical fiber at the end. As more essential means, it is effective to provide optical isolator between the semiconductor laser diode and the optical fiber.

However, when an optical isolator is used, there has been a problem such that, in addition to the high cost of the optical isolator, lenses are required an front and at the back of the optical isolator resulting an increased number of components which inhibits cost reduction of the system as a whole. There has also been such a problem that the use of the optical isolator requires complicated adjustment of the optical axis which increases the cost in terms of an adjustment operation. Further, there has been a problem such that integrating the optical isolator and the lenses into the optical system inhibits size reduction of the system.

SUMMARY OF THE INVENTION

That is, an object of the present invention is to provide a small and low-cost semiconductor laser module incorporating an optical isolator therein, thereby contributing to a reduction in size and cost of optical communications systems.

In order to achieve the object described above, the semiconductor laser module of the present invention comprises a semiconductor laser diode chip mounted on a substrate, a first optical waveguide formed on the substrate for transmitting laser light emitted by the semiconductor laser diode chip, a second optical waveguide formed on the substrate and separated by a predetermined space from the first optical waveguide, and an optical isolator chip mounted between the first optical waveguide and the second optical waveguide.

With this configuration, it becomes possible for the laser light emitted by the semiconductor laser diode chip to transmit through the first optical waveguide, the optical isolator chip and the second optical waveguide, thereby to be output to the outside, while preventing the reflected light from entering back into the semiconductor laser diode chip and maintaining stable laser oscillation.

In the semiconductor laser module of the present invention, it is preferable that the first and the second optical waveguides be made by dividing one optical waveguide, which is formed on the substrate, by means of a groove formed in the optical waveguide, for the purpose of aligning the optical axes of the waveguides.

At least one of the two side walls of the groove is preferably formed in a direction not at right angles to the optical axis of the first optical waveguide or the second optical waveguide. This configuration causes the reflected light to propagate in a direction different from the optical axis of the optical waveguide, thereby making it possible to more effectively prevent the reflected light from entering back into the laser diode.

Also according to the present invention, the optical isolator chip preferably comprises a Faraday rotator and polarizing elements provided on both sides of the Faraday rotator.

The semiconductor laser module of the present invention also preferably comprises a magnet of semi-cylindrical shape provided to cover the optical isolator chip, in order to apply magnetic field to the optical isolator.

Also in the semiconductor laser module of the present invention, magnets may be mounted on the first and the second optical waveguides on both sides of the optical isolator chip.

Further in the semiconductor laser module of the present invention, magnets may also be mounted to interpose the optical isolator chip therebetween inside the groove.

Also in the semiconductor laser module of the present invention, the substrate preferably has the semiconductor laser diode chip, the first and the second optical waveguides and a cover which covers the optical isolator hip provided thereon, while a magnet may be mounted on the cover for applying magnetic field to the optical isolator chip.

Also in the semiconductor laser module of the present invention, it is preferable to form a lens on the output end of the first optical waveguide and form a lens on the input end of the second optical waveguide.

DETAILED DESCRIPTION OF THE PREFERRED EMBODIMENTS

Now referring to the accompanying drawings, preferred embodiments of the present invention will be described below.

Embodiment 1

Figure 1:
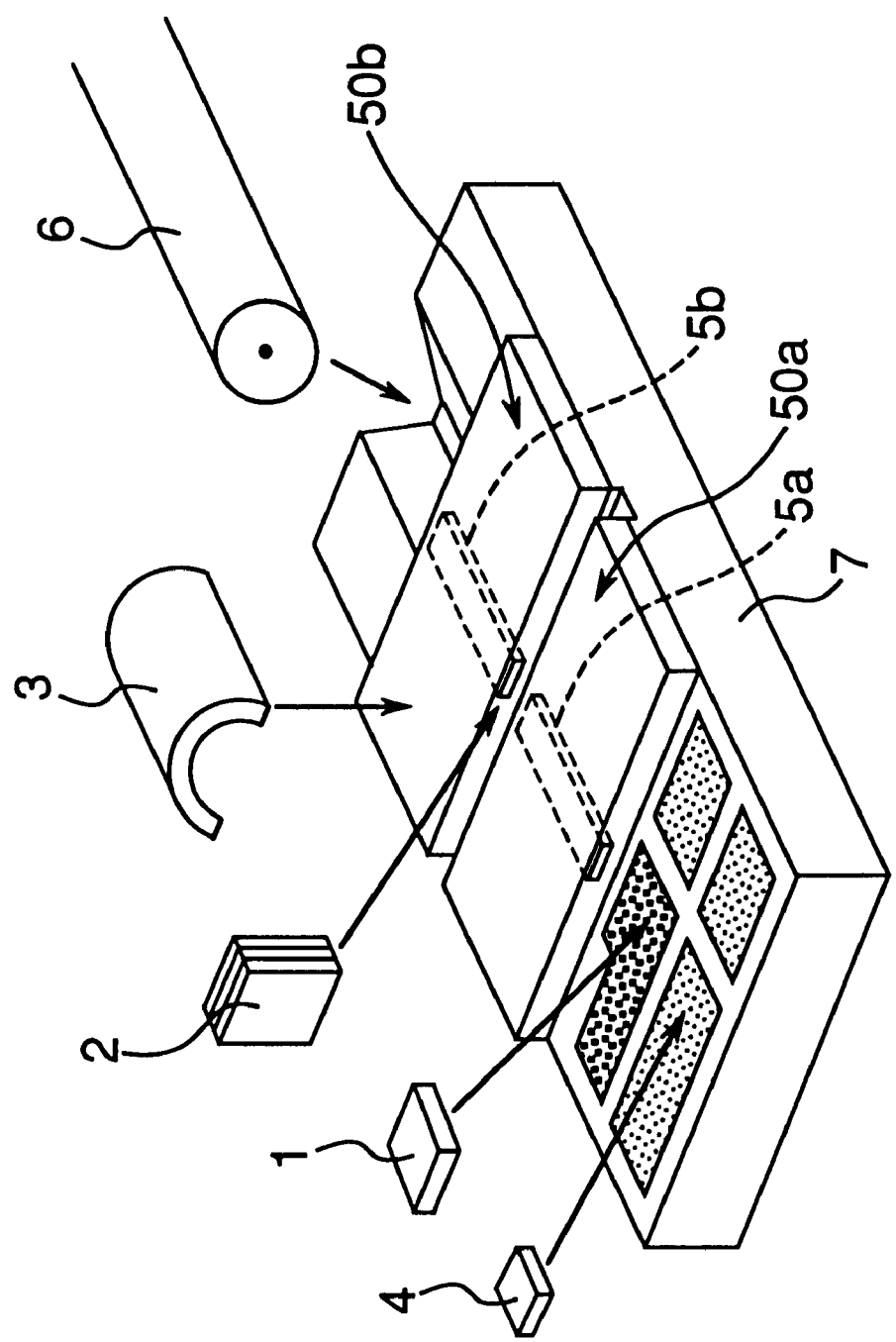
FIG. 1 is a perspective view schematically showing the configuration of a semiconductor laser module according to a first embodiment of the present invention.
Figure 2A:
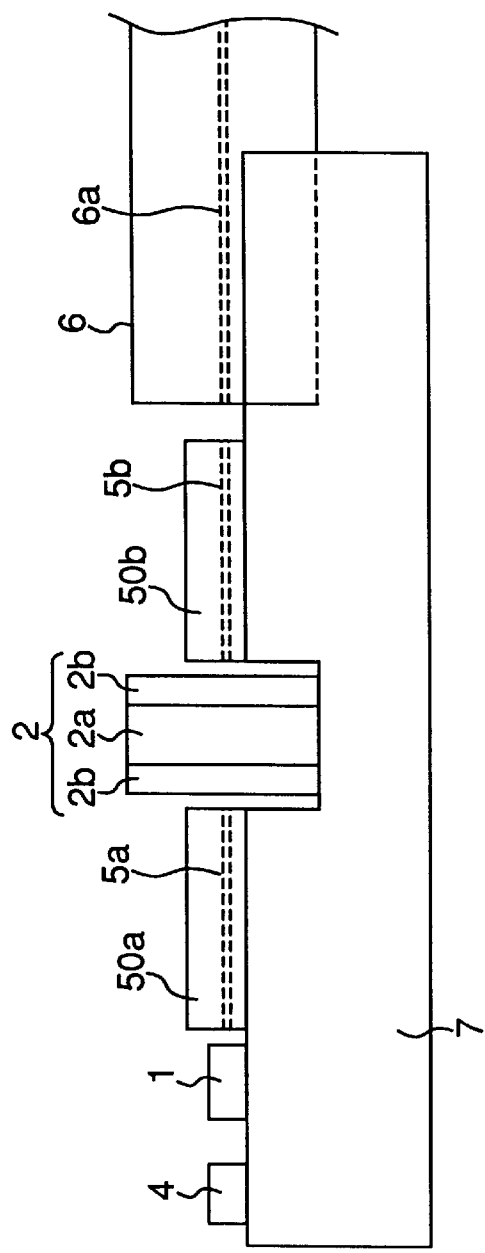
FIG. 2A is a side view of the semiconductor laser module according to the first embodiment.

FIG. 1 is a perspective view schematically showing the configuration of a semiconductor laser module according to the first embodiment of the present invention. FIG. 2A is a side view of the semiconductor laser module of the first embodiment and FIG. 2B is a plan view of the semiconductor laser module of the first embodiment.

Figure 2B:
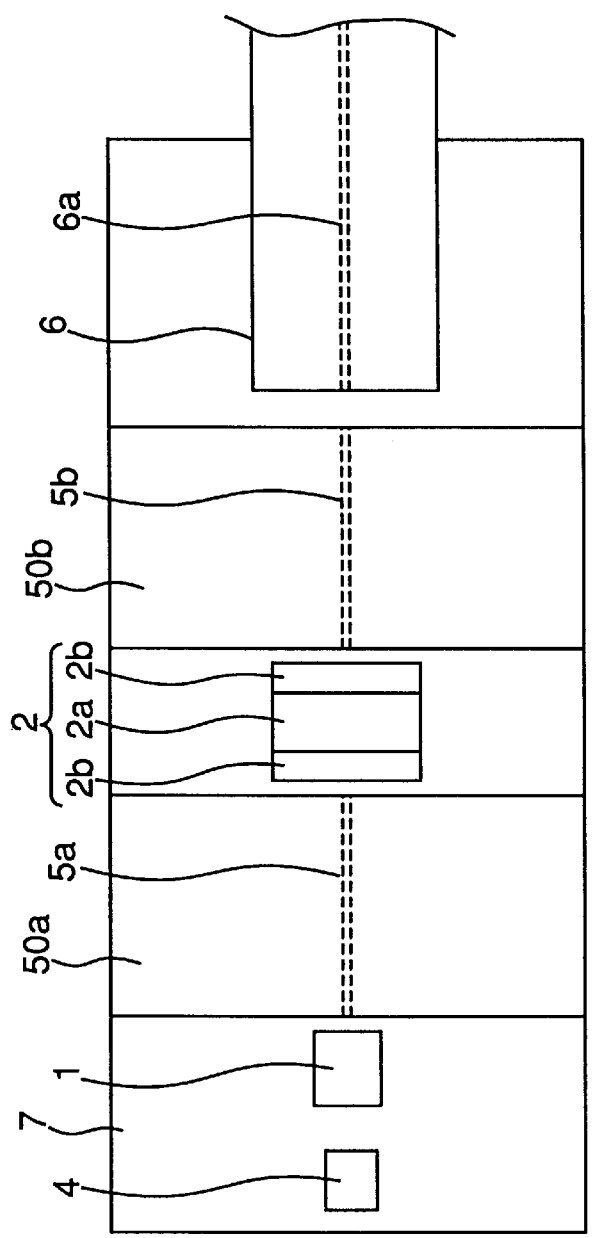
FIG. 2B is a plan view of the semiconductor laser module according to the first embodiment.
Figure 3:
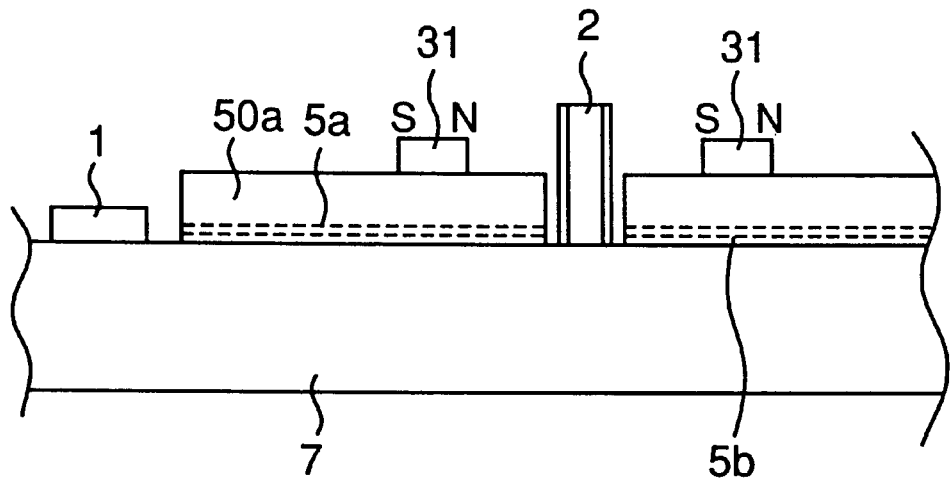
FIG. 3 is a side view of a variation (No. 1) of the first embodiment.

As shown in FIGS. 1 to 3, the semiconductor laser module of the first embodiment comprises a semiconductor laser diode chip 1, a first optical waveguide 50a, an optical isolator chip 2 and a second optical waveguide 50b which are mounted sequentially in the propagating direction of light emitted from one end of the semiconductor laser diode chip I on a substrate 7 made of, for example, Si. In the semiconductor laser module of the first embodiment, a photodiode chip 4 is provided for monitoring light emitted from the other end of the semiconductor laser diode chip 1. The second optical waveguide 50b has an optical fiber 6 connected thereto, and the optical isolator chip 2 has a magnet 3 of a semi-cylindrical shape mounted thereon to cover the chip. The magnet 3 is omitted from FIG. 2A and FIG. 2B.

The semiconductor laser module of the first embodiment made in such a configuration as described above can be made smaller in size and lighter in weight, and is also capable of preventing laser light reflected from a junction between the second optical waveguide 50b and the optical fiber from entering the laser diode 1 via the optical waveguides 50a, 50b, thereby making it possible to achieve extremely stable oscillation of the laser diode 1.

More specifically, $SiO_2$ or the like is deposited on the substrate 7 thereby to form the optical waveguide from quartz. A core portion of the optical waveguide made of quartz is given a higher refractive index than other portions by adding an impurity or replacing some of the constituent elements with other element, thereby to function as a waveguide.

Then a groove 70 is formed in the optical waveguide made of quartz by means of a dicing saw or the like, thereby to divide the optical waveguide made of quartz into two portions, one at the front and the other at the rear, and forming the first optical waveguide 50a and the second optical waveguide 50b which oppose each other. Side faces of the groove 70 formed in the optical waveguide made of quartz preferably lie in a direction not at right angles to a core 5a of the first optical waveguide 50a and a core 5b of the second optical waveguide 50b. With this configuration, it is possible to prevent light reflected on the surface of the optical isolator chip 2, for example, from entering the first optical waveguide 50a or the second optical waveguide 50b. Depth of the groove 70 is determined so that center of the optical isolator chip 2 substantially coincides with the core 5a of the first optical waveguide 50a and the core 5b of the second optical waveguide 50b when the optical isolator chip 2 is placed on the groove 70.

Then the optical isolator chip 2 is secured in the groove 70 by means of an adhesive or the like while aligning the optical axis of the optical isolator chip 2 to replacing coincide with the optical axis of the first optical waveguide 50a and the optical axis of the second optical waveguide 50b. The optical isolator chip 2 comprises a Faraday rotator 2a and polarizing elements 2b provided on both sides of the Faraday rotator. In the optical isolator chip 2, light emerging from the first optical waveguide 50a experiences a certain amount of rotation of its polarization plane caused by the Faraday rotator 2a, and enters the optical waveguide 50b via the polarizing element 2b. However, light emerging from the second optical waveguide 50b experiences a certain amount of its rotation of polarization plane caused by the Faraday rotator 2a, and is interrupted by the polarizing element 2b thus resulting in no output.

The Faraday rotator 2a is preferably made of a material having a significant magneto-optical effect and low light absorption, for example, paramagnetic garnet, rare earth iron garnet or the like is used for the material. The length of the Faraday rotator 2a in the direction of light propagation is determined so that the polarization plane of light rotates by 45° in the Faraday rotator 2a.

Then the semiconductor laser diode chip 1, which is a DBF laser, for example, is bonded onto the substrate 7 while bringing the input end of the first optical waveguide 50a near to the output end of the semiconductor laser diode chip 1 with the optical axes thereof aligned with each other.

When bonding the semiconductor laser diode chip 1, it is necessary to align the optical axis of the first optical waveguide 50a and the optical axis of the laser diode chip 1 with a high accuracy. In the first embodiment, therefore, accurate positioning marks are made on the substrate 7 and on the semiconductor laser diode chip 1, which is bonded accurately while monitoring the positioning marks with infrared light. In such a bonding process, the optical axes can be accurately and easily aligned.

Then the input end face of optical fiber 6 and the output end face of the second optical waveguide 50b are brought to oppose each other. While the core 6a of the optical fiber 6 and the core 5b of the second optical waveguide 50b are aligned so that the optical axes thereof substantially coincide with each other, these components are secured. In the first embodiment, since the V groove is formed on the substrate 7 in advance in order to make the alignment of the optical axis of the optical fiber and fastening thereof easier, the second optical waveguide 50b and the optical fiber 6 can be easily aligned.

In the semiconductor laser module of the first embodiment made as described above, laser light emitted by the semiconductor laser diode chip 1 passes through the first optical waveguide 50a, the optical isolator chip 2 and the second optical waveguide 50b and enters the optical fiber 6 to be transmitted.

Light reflected from the end face of the optical fiber 6 is, on the other hand, prevented from entering the semiconductor laser diode chip 1 by the optical isolator chip 2 located between the first optical waveguide 50a and the second optical waveguide 50b, thus making it possible to achieve stable laser oscillation of the semiconductor laser diode chip 1.

Figure 9A:
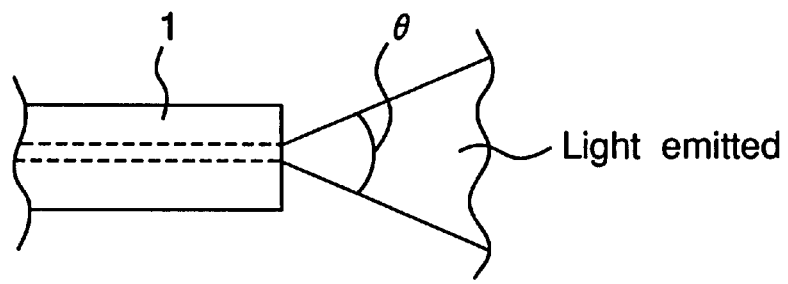
FIG. 9A is a schematic diagram showing the spread of laser light emitted from the semiconductor laser diode chip.
Figure 9B:
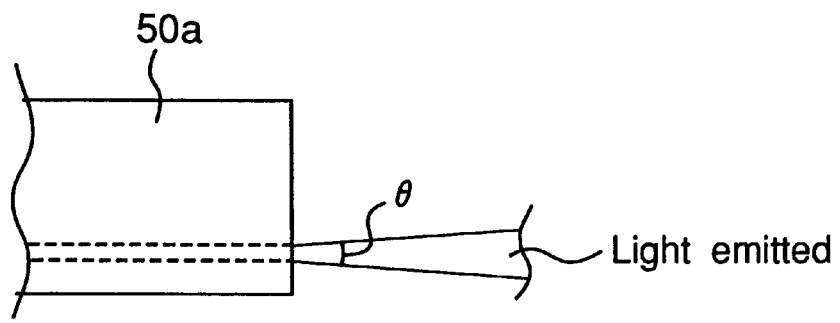
FIG. 9B is a schematic diagram showing the spread of laser light emitted from the optical waveguide.

In the semiconductor laser module of the first embodiment made as described above, by providing the optical isolator chip 2 between the first optical waveguide 50a and the second optical waveguide 50b, it is possible to transmit laser light emitted by the semiconductor laser diode chip 1 efficiently through the optical fiber 6 without using a lens. Specifically, since light emitted by the semiconductor laser diode chip 1 emerges with a relatively large angle of emission θ as shown in FIG. 9B, the light beam further spreads in the optical isolator chip 2 in case the emitted light is directly input to the optical isolator chip 2, resulting in only a fraction of the emitted light being fed to the optical fiber 6. For this reason, in the prior art, a lens has been placed between the laser diode and the optical isolator thereby to converge the spread light beam with the lens before feeding the light to the optical isolator, thereby preventing the light beam from spreading in the optical isolator in order to achieve efficient transmission of light.

Meanwhile the inventors of this application found that laser light emitted via an optical waveguide emerges with a smaller angle of emission θ than that emitted by the laser diode chip 1 as shown in FIG. 9B, and completed the present invention on the basis of this finding. Specifically, in the semiconductor laser module of the first embodiment, laser light emitted via the first optical waveguide 50a emerges with a smaller angle of emission θ than that emitted by the semiconductor laser diode chip 1 as shown in FIG. 9. The light emerging with this smaller angle is transmitted without spreading after entering the optical isolator chip 2, and is transmitted efficiently to the second optical waveguide 50b.

The semiconductor laser module of the first embodiment, as described above, can be made smaller in size and lighter in weight than the prior art and made in a modular construction, because the first and the second optical waveguides 50a, 50b are used instead of the lens of the prior art.

Also the semiconductor laser module of the first embodiment can be produced at a lower cost, because the lens is not used and therefore the cost of adjusting the optical axis in the production process can be drastically reduced.

Moreover, production cost of the semiconductor laser module of the first embodiment can be reduced further because the first and the second optical waveguides are formed integrally with the substrate, by depositing the SiO$_2$ film on the substrate 7 thereby reducing the number of components.

While the magnet 3 having a semi-cylindrical shape is used in the semiconductor laser module of the first embodiment, the present invention is not limited to this configuration and two flat magnets 31, instead of the magnet 3, may also be mounted on the first and the second optical waveguides 50a, 50b as shown in FIG. 3. With this configuration, thickness of the module as a whole can be made smaller.

Figure 4:
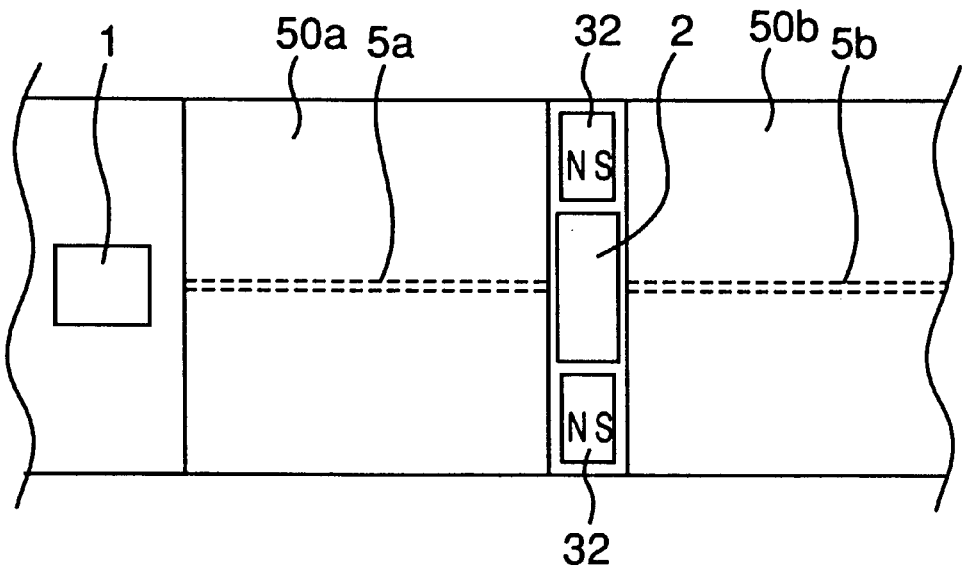
FIG. 4 is a plan view of a variation (No. 2) of the first embodiment.

Also according to the present invention, two flat magnets 32, instead of the magnet 3, may also be mounted on both sides of the optical isolator chip 2 in the groove 70 as shown in FIG. 4. With this configuration, the thickness of the module as a whole can be made smaller.

Figure 5:
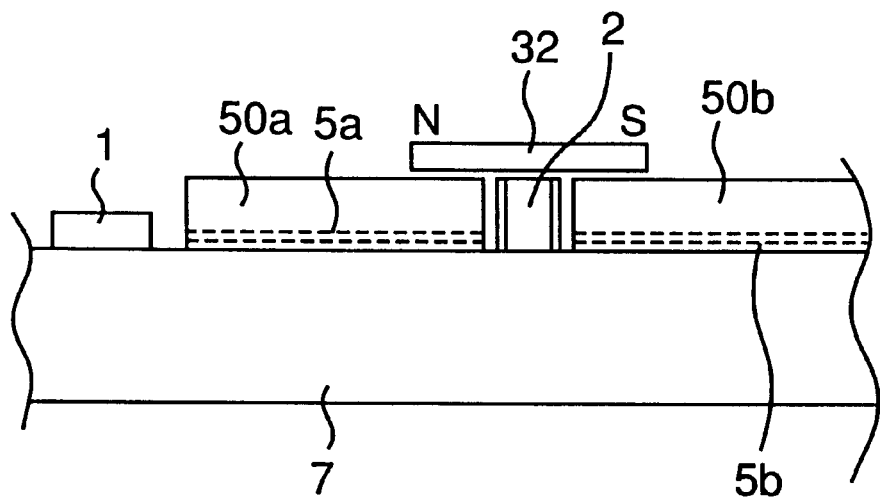
FIG. 5 is a side view of a variation (No. 3) of the first embodiment.

Also according to the present invention, one flat magnet 33, instead of the magnet 3, may also be mounted on the optical isolator chip 2 as shown in FIG. 5. In this case, the flat magnet 33 is disposed so that one of the N pole and the S pole is positioned over the first optical waveguide 50a and the other pole is positioned over the second optical waveguide 50b. With this configuration, too, the thickness of the module as a whole can be made smaller.

Figure 6:
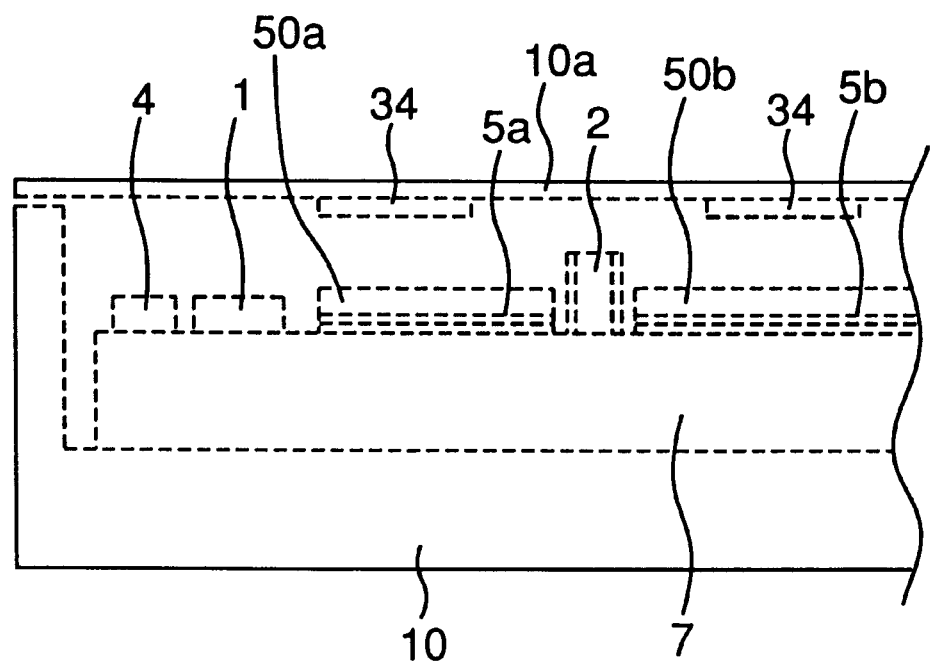
FIG. 6 is a side view of a variation (No. 4) of the first embodiment.

According to the present invention, alternatively, two flat magnets 34 may be mounted on a package cover 10a instead of the magnet 3. As shown in FIG. 6, the substrate 7 having the semiconductor laser diode chip 1, the optical isolator chip 2 and the other mounted thereon is disposed on a package 10 and a package cover 10a having the flat magnets 34 mounted thereon is placed on the package 10. The flat magnets 34 are mounted so as to be located on both sides of the optical isolator chip 2 when the package cover 10a is mounted on the package 10. This configuration makes it possible, also in case the magnets are bonded by using a thermosetting resin, to harden the thermosetting resin without heating the semiconductor laser diode chip and others.

Furthermore, according to the present invention, an optical isolator chip which does not require magnets may also be used. This makes the configuration simpler and reduces the production cost.

Figure 8:
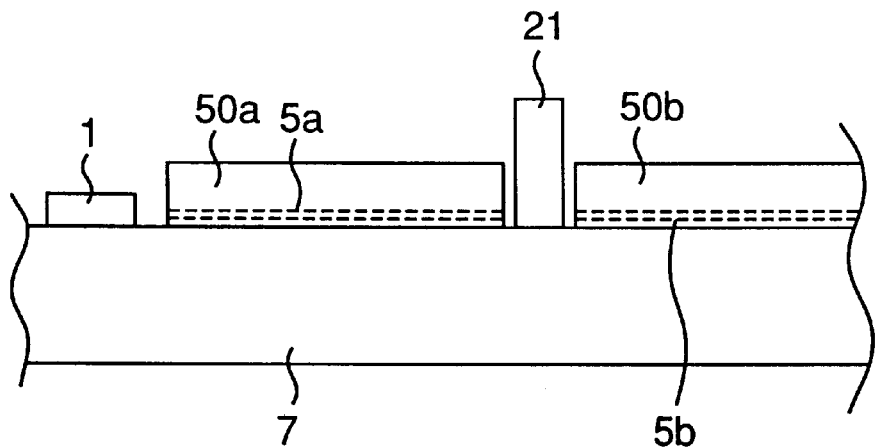
FIG. 8 is a side view of the semiconductor laser module of a variation according to the present invention.

The semiconductor laser module of the first embodiment described above employs the optical isolator chip 2 having the Faraday rotator 2a mounted between the two polarizing elements 2b, but the present invention is not limited to this configuration and an optical isolator chip 21 made by using the Faraday rotator only without using the polarizing element as shown in FIG. 8 may also be used. With this configuration, although the influence of the reflected light cannot be suppressed as effectively as in the optical isolator chip 2 having the Faraday rotator 2a mounted between the two polarizing elements 2b, the production cost can be reduced.

Embodiment 2

Figure 7A:
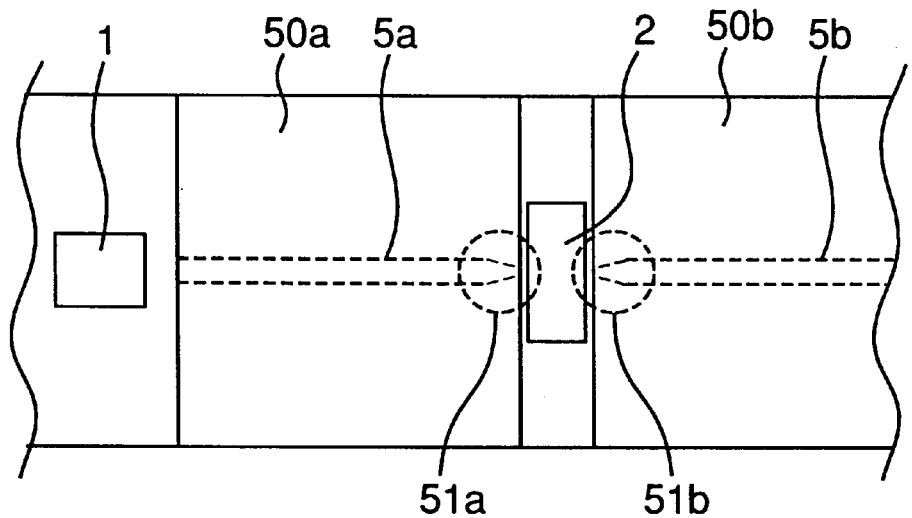
FIG. 7A is a plan view of a semiconductor laser module according to a second embodiment of the present invention.
Figure 7B:
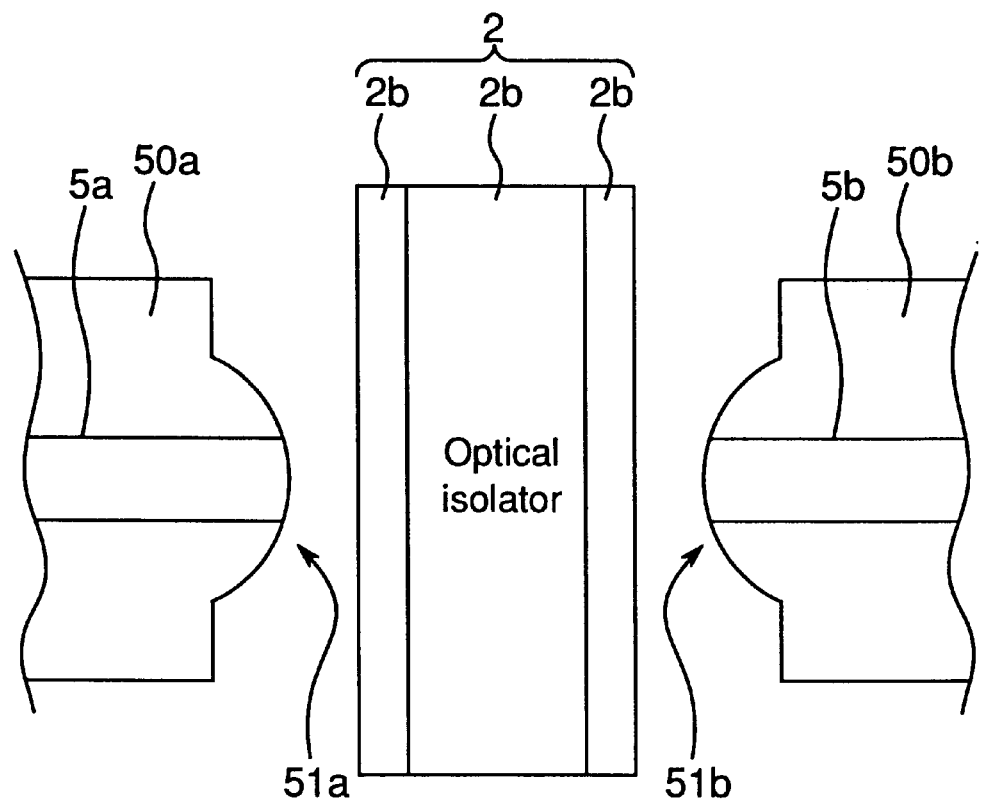
FIG. 7B is an enlarged view of the lens thereof.

The semiconductor laser module according to the second embodiment of the present invention has a configuration similar to that of the first embodiment, except that lenses 51a, 51b are formed on the end faces of the first optical waveguide 50a and the second optical waveguide 50b which oppose each other, respectively, as shown in FIG. 7A.

Specifically, in the semiconductor laser module of the second embodiment, end faces of the first optical waveguide 50a and the second optical waveguide 50b which oppose the optical isolator chip 2 are processed into semi-spheres having a radius of 20 μm, for example, by means of photolithography or dry etching, for example, thereby to form lenses 51a, 51b.

In the semiconductor laser module of the second embodiment made in the configuration described above, spread of the light beam which causes a loss in light energy can be further reduced at the optical isolator chip 2 and in the vicinity thereof in the light propagation path, and therefore light can be transmitted more efficiently than in the first embodiment.

The semiconductor laser module of the present invention comprises the optical isolator chip provided between the first optical waveguide and the second optical waveguide, as described in detail above, and therefore stable oscillation of laser can be achieved. Thus according to the present invention, a semiconductor laser module with the optical isolator incorporated therein which is small in size and low in price can be provided, thus contributing to the reduction of size and price of optical communications systems.

Also in the semiconductor laser module of the present invention, because the first and the second optical waveguides are made by dividing one optical waveguide, which is formed on the substrate, by means of a groove formed in the optical waveguide, the optical axes of the first and the second waveguides can be easily aligned, resulting in lower cost.

Because at least one of the two side walls of the groove is formed in a direction not at right angles to the optical axis of the first optical waveguide or the optical axis of the second optical waveguide, the reflected light can be caused to propagate in a direction different from the optical axis of the optical waveguide, thereby making it possible to more effectively prevent the reflected light from entering the laser diode.

Also according to the present invention, because the optical isolator chip comprises a Faraday rotator and the polarizing elements provided on both sides of the Faraday rotator, reflected light can be more effectively prevented from entering the laser diode.

Also because the semiconductor laser module of the present invention comprises a magnet having a semi-cylindrical shape mounted to cover the optical isolator chip in order to apply magnetic field to the optical isolator chip, reflected light can be more effectively prevented from entering back into the laser diode.

The semiconductor laser module of the present invention can also be smaller in thickness because the magnets are mounted on the first and the second optical waveguides located on both sides of the optical isolator chip.

The semiconductor laser module of the present invention can be made smaller also by providing the magnets on opposite sides of the optical isolator chip, inside the groove.

The semiconductor laser module of the present invention can also be given higher weatherability by providing a cover which covers the semiconductor laser diode chip, the first and the second optical waveguides, and the optical isolator chip mounted on the substrate.

Also in the semiconductor laser module of the present invention, because a lens is formed on the output end of the first optical waveguide and a lens is formed on the input end of the second optical waveguide, light emitted by the laser chip can be output efficiently.

What is claimed is:

1. A semiconductor laser module comprising:

a substrate, a semiconductor laser diode chip mounted on said substrate, a first optical waveguide on said substrate for transmitting laser light emitted by said semiconductor laser diode chip, a second optical waveguide on said substrate and separated from said first optical waveguide, an optical isolator chip mounted between said first optical waveguide and said second optical waveguide, a cover covering said optical isolator chip, and a magnet mounted on said cover for applying a magnetic field to said optical isolator chip.

2. The semiconductor laser module according to claim 1 wherein said first and second optical waveguides are made by dividing a single optical waveguide formed on said substrate, said first and second optical waveguides being separated by a groove.

3. The semiconductor laser module according to claim 2 wherein at least one of two side walls of the groove is not at a right angle to the optical axes of one of said first optical waveguide said second optical waveguide.

4. The semiconductor laser module according to claim 1 wherein said optical isolator chip comprises a Faraday rotator and polarizing elements located on opposite sides of said Faraday rotator.

5. The semiconductor laser module according to claim 1 comprising a first lens located on an output end of said first optical waveguide and a second lens located on an input end of said second optical waveguide.

6. The semiconductor laser module according to claim 1 wherein said optical isolator chip is mounted on said substrate.

7. The semiconductor laser module according to claim 6 wherein said magnet comprises two substantially planar magnets mounted on said cover and disposed opposite said first and second optical waveguides, respectively, on opposite sides of said optical isolator chip.

* * * * *